Patented Oct. 23, 1934

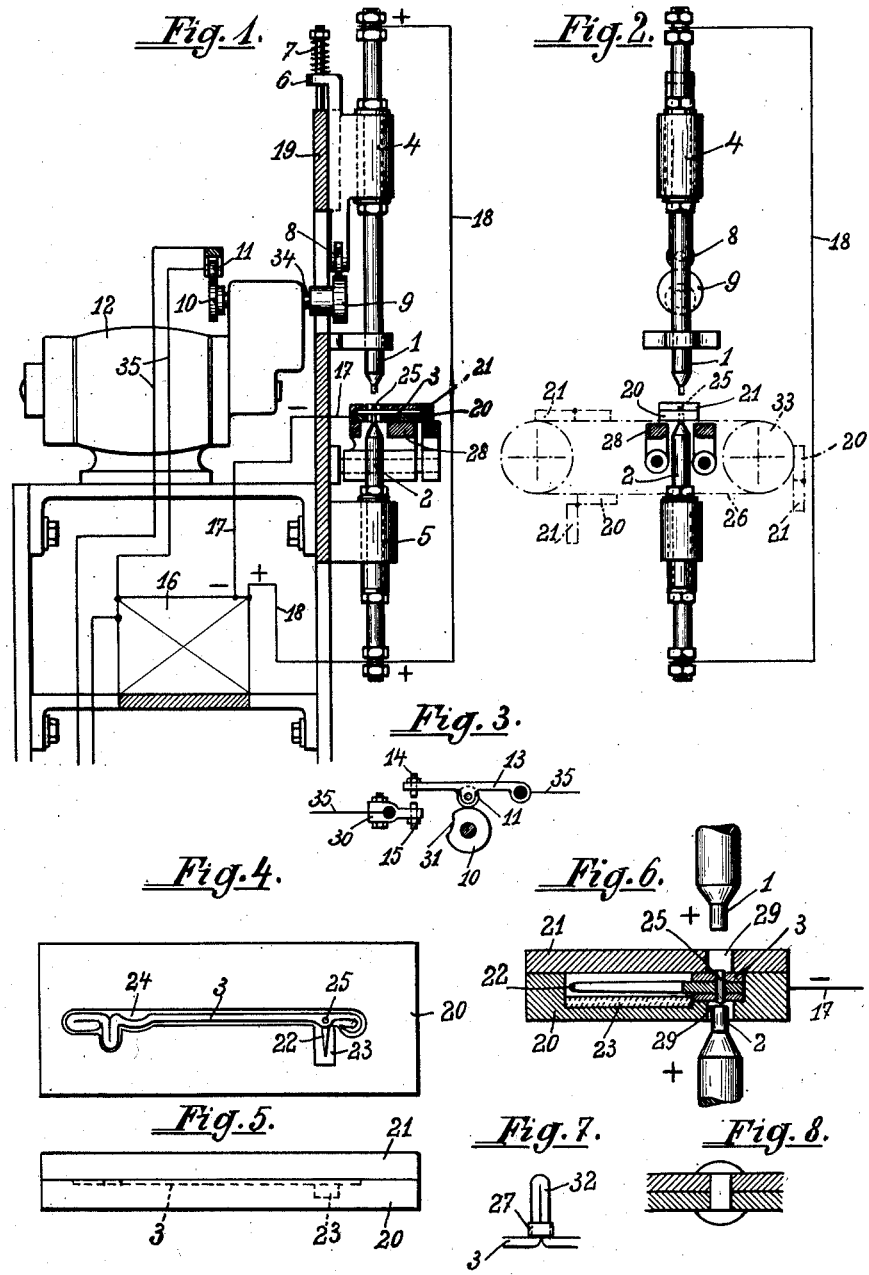

1,978,363

UNITED STATES PATENT OFFICE 1,978,363

METHOD AND APPARATUS FOR ELECTRIC RIVETING

Gottfried Fuchs and Hermann Späth, Stuttgart-Cannstatt, Germany

Application August 10, 1932, Serial No. 628,200 In Germany June 9, 1932

7 Claims. (Cl. 219—2)

The latches of the needles for knitting machines and the like have up to the present been fixed exclusively by cutting screw threads and inserting the pin having also a screw thread. The pin is riveted on both sides after it has been screwed in. During the grinding of the two flat sides it happens that the rivet edge is removed by grinding, so that after the needles have been in use for a short time the rivet and the latch drop out.

Experiments with electric welding machines have been conducted, to rigidly weld in the pins. Satisfactory results have however not been attained for the reason that for welding opposite electrodes with unlike poles are used, so that the circuit is closed inside the rivets. It therefore happened, that the latch was also rigidly welded. If one attempts to make the latch movable, it breaks off. In these welding devices a deposit is formed on one electrode, which during repeated welding becomes so thick that the electrode becomes useless.

These inconveniences are obviated by the method and the machine for electric welding of workpieces of all kinds according to the invention.

The method is characterized in that, opposite the ends of the rivet or the like to be welded two electrodes with like poles are arranged, so that the rivet merely forms the connection between the two like poles, whereas the counter pole is connected with the workpiece. The circuit is thereby closed in those portions of the side wall on which the needle touches the rivet. The latch of the needle is insulated, in order that the latch does not come into contact with the counter pole.

The machine consists of two oppositely arranged like electrodes, the one of which is movable and the other stationary. The workpiece is placed with the rivet to be welded on the lower stationary electrode and securely held in this position. The counter pole is separately moved against the workpiece. After the workpiece has been clamped, the movable electrode, adapted to be moved by a carriage or the like, is lightly pressed onto the rivet to be welded, whereby the welding of the rivet is effected. The circuit is interrupted by the cut-out on the primary side at the instant shortly before the movable electrode is moved backwards. The formation of a light arc between the workpiece and the movable electrode is thereby prevented.

Two weldings are carried out by the method and by the machine by means of the two like poles, i. e. only the ends of the rivet are welded, whereas the latch between the same, which is rendered currentless, is not welded. The method and the machine can also be used for the welding of rivet points of any kind, such as employed for boiler riveting, bridge building etc., so that the pneumatic tools are no longer necessary. The contacting surfaces of the rivet heads and also of the rivet shank are completely welded together with the workpiece, so that the entire rivet forms one whole with the workpiece.

A machine for carrying out the method for the welding and hard soldering of workpieces of any kind, especially of the latches on knitting machine needles is illustrated by way of example in the accompanying drawing in which:

Fig. 1 is a vertical section and

Fig. 2 a front elevation of the machine.

Fig. 3 shows the cut-out.

Fig. 4 shows the holding plate for the workpiece with the needle inserted and cover plate removed.

Fig. 5 is a front elevation of Fig. 4 with the cover plate in position.

Fig. 6 is a cross section of Fig. 5 on a larger scale.

Figs. 7 and 8 show two other workpieces.

The electrodes 1 and 2 are arranged the one perpendicularly above the other. The electrode 1 is mounted in a carriage 4 on the machine frame 19 so that it is movable in vertical direction. The carriage 4 is moved by an eccentric 9 driven by the electric motor 12. A roller 8 mounted in an arm of the carriage 4 bears continually against the eccentric 9, the carriage 4 being pressed against the eccentric 9 by the action of a spring 7. The lower electrode 2 is fixed in a bracket 5. Both electrodes 1 and 2 are fixed, adjustable in axial direction, in the carriage 4 and in the bracket 5 respectively. A horizontal machine table 28 is arranged in the same horizontal plane as the lower electrode on the machine frame 19 so that it can be adjusted in vertical direction. On this table 28 a plate 20, carrying the workpiece, is placed or removably fixed. This plate 20 has an indentation 24, corresponding in shape to the workpiece 3. A cover 21 placed on the plate 20 secures the workpiece in its position. In the plate 20 and in the cover 21 vertical holes 29 are bored, into which the ends of a rivet 25 extend. These holes 29 are so wide that the electrodes 1 and 2 can be inserted. The latch 22 is placed at right angles to the needle 3. This needle lies on an insulating plate 23, so that the needle is situated currentless between the plate 20 and the cover 21. On a shaft 34 driven by the electric motor 12 a cam disc 10 is keyed adapted to actuate the cut out. Against this cam disc 10 bears a roller 11, which is mounted in an oscillatable arm 13 controlled by a spring. An adjustable contact screw 14 is screwed through the end of the arm 13. Below the arm 13 an arm 30 is stationarily mounted, in the end of which an adjustable contact screw 15 is arranged opposite the screw 14.

When the cam disc 10 rotates the roller 11 drops into the cavity 31 of the cam disc 10 so that the contact screw 14 of the spring controlled arm 13 is pressed against the contact screw 15 and the circuit 35 through the electrodes and the workpiece is closed. The welding period can be regulated by adjusting the position of the contact screws 14 and 15. A transformer 16 is arranged in the machine frame underneath the electric motor 12. The lead 35 for the contact screws 14, 15 is arranged on the primary side and the leads 17, 18 for the electrodes 1 and 2 and for the workpiece are connected to the secondary side of the transformer 16.

The operation is as follows:

After the workpiece 3 has been inserted between the plate 20 and cover 21 and this plate placed on the table 28, or removably fixed on the same, the motor is started so that the eccentric 9 and cam disc 10 are rotated. The carriage 4 with the electrode 2 descends under the influence of the spring 7 such a distance, that it comes to bear against the projecting end of the rivet 25. The electrode 2 does not bear rigidly against the rivet but resiliently under the influence of the spring 7. The electrodes 1 and 2 may be arranged the one relative to the other inclined instead of vertically. As soon as the electrodes 1 and 2 come to bear against the rivet 25, the circuit 17, 18 is closed through the intermediary of the cam disc 10 by the two cut out screws 14, 15. As soon as the welding has been completed, the arm 13 is lifted again by the cam disc 10, so that the contact screws 14, 15 are separated the one from the other whereby the circuit 17, 18 is cut out again. Shortly after the interruption of the circuit 17, 18 the electrode 1 is lifted again by the eccentric. As the circuit 17, 18 is first interrupted and the electrode 1 lifted off only thereafter, the formation of a spark is avoided. After the welding of the rivet 25, the cover 21 is removed and a fresh workpiece inserted, whereupon the operation is repeated.

The workpieces 3 can be conveyed to the electrodes 1 and 2 by means of an endless band or chain 26 (Fig. 2). In this case plates 20 are fixed on the endless band and a cover plate 21 is hingedly connected with each plate 20. As soon as the plate 20 arrives on the top side of the endless band 26 the workpiece 3 can be inserted and the cover plate 21 closed. When the movement of the endless band 26 continues, the plates 20 and cover 21 are brought into the welding position between the electrodes 1 and 2. The endless band is intermittently moved, so that the plate 20 and cover 21 coming from the welding point are passed along the sprocket wheel 33, so that in the vertical position the cover plate 21 drops down and the welded work drops into a collecting vessel. Other workpieces than knitting machine needles 3 can be welded in the machine. The lower electrode 2 may be movably mounted instead of the upper electrode 1, or both electrodes may be movable. The rings 27, which hold together the head 32 of the knitting needles 3, may be welded in the manner described so that they are rigidly connected with the head as shown in Fig. 7.

Fig. 8 shows by way of example two sheet metal plates connected by a rivet the ends of the electrodes 1 and 2 are shaped in accordance with the rivet to be welded.

Instead of a transformer 16 an accumulator may be used which has a potential of 2 volts.

The welding method may be employed also for welding on the reeds in musical instruments.

We claim:—

1. A method for the electric riveting of workpieces of any kind and especially of the latches on knitting machine needles and the like, consisting in connecting the negative pole of a source of electric current to the workpiece, inserting a rivet in the workpiece, and in bringing two electrodes both connected to the positive pole of the source of current into contact with the two ends of the rivet to simultaneously supply current to the two ends of the rivet.

2. A machine for riveting the latch to a knitting machine needle, comprising in combination a frame, a work holder fixed on said frame, a stationary electrode fixed on said frame under said holder, a carriage shiftable on said frame above said holder, a second electrode carried by said carriage coaxially with said stationary electrode, means for shifting said carriage on said frame to move said second electrode towards and away from said stationary electrode to bring the points of said electrodes into contact with the rivet, a source of electric current, a wire connecting both of said electrodes to one pole of said source of current, and a wire connecting said holder to the other pole of said source of current.

3. A machine for riveting the latch to a knitting machine needle, comprising in combination a frame, a work holder fixed on said frame, a stationary electrode fixed on said frame under said holder, a carriage shiftable on said frame above said holder, a second electrode carried by said carriage coaxially with said stationary electrode, a spring on said frame pressing said carriage in downward direction to approach said second electrode towards said stationary electrode, a motor on said frame, a shaft driven by said motor, a cam on said shaft bearing against the under side of said carriage and adapted to lift said carriage to move said second electrode away from said stationary electrode, a source of current, a wire connecting both of said electrodes to one pole of said source of current, and a second wire connecting the other pole of said source of current to said work holders.

4. A machine for riveting the latch to a knitting machine needle, comprising in combination a frame, a work holder fixed on said frame, a stationary electrode fixed on said frame under said holder, a carriage shiftable on said frame above said holder, a second electrode carried by said carriage coaxially with said stationary electrode, a spring on said frame pressing said carriage in downward direction to approach said second electrode towards said stationary electrode, a motor on said frame, a shaft driven by said motor, a cam on said shaft bearing against the under side of said carriage and adapted to lift said carriage to move said second electrode away from said stationary electrode, a transformer on said frame, a circuit connected to the input terminals of said transformer, a rocker lever connected up in said circuit, an interrupter screw carried by said lever, a stationary element connected up in said circuit, a second interrupter screw carried by said stationary element, a second cam on said shaft adapted to cooperate with said lever to bring said screws into contact to close said circuit, a wire connecting one output terminal of said transformer to both of said electrodes, and a second wire connecting the other output terminal of said transformer to said work holder.

5. A machine for riveting the latch to a knitting machine needle, comprising in combination a frame, a work holder fixed on said frame, a stationary electrode fixed on said frame under said holder, a carriage shiftable on said frame above said holder, a second electrode carried by said carriage coaxially with said stationary electrode, a spring on said frame pressing said carriage in downward direction to approach said second electrode towards said stationary electrode, a motor on said frame, a shaft driven by said motor, a cam on said shaft bearing against the under side of said carriage and adapted to lift said carriage to move said second electrode away from said stationary electrode, a transformer on said frame, a circuit connected to the input terminals of said transformer, a rocker lever connected up in said circuit, an interrupter screw carried by said lever, a stationary element connected up in said circuit, a second interrupter screw carried by said stationary element, a second cam on said shaft adapted to cooperate with said lever to bring said screws into contact to close said circuit, a wire connecting one output terminal of said transformer to both of said electrodes; a second wire connecting the other output terminal of said transformer to said work holder, and means for adjusting said screws to regulate the welding period.

6. A machine for riveting the latch to a knitting machine needle, comprising in combination a frame, a work holder fixed on said frame, a stationary electrode fixed on said frame under said holder, a carriage shiftable on said frame above said holder, a second electrode carried by said carriage coaxially with said stationary electrode, a spring on said frame pressing said carriage in downward direction to approach said second electrode towards said stationary electrode, a motor on said frame, a shaft driven by said motor, a cam on said shaft bearing against the under side of said carriage and adapted lift said carriage to move said second electrode away from said stationary electrode, a transformer on said frame, a circuit connected to the input terminals of said transformer, a rocker lever connected up in said circuit, an interrupter screw carried by said lever, a stationary element connected up in said circuit, a second interrupter screw carried by said stationary element, a second cam on said shaft adapted to cooperate with said lever to bring said screws into contact to close said circuit and to move said screws apart to interrupt said circuit shortly before said movable electrode is moved away from said stationary electrode by said carriage, a wire connecting one output terminal of said transformer to both of said electrodes, and a second wire connecting the other output terminal of said transformer to said work holder.

7. In a machine as specified in claim 3 the work holder comprising in combination a plate having a cavity corresponding to the shape of the shape of the workpiece, and a cover plate on said first mentioned plate adapted to securely hold the workpiece in position.

GOTTFRIED FUCHS.
HERMANN SPÄTH.